United States Patent Office 3,418,384
Patented Dec. 24, 1968

3,418,384
ADDUCTS OF BICYCLO-3,3,0-OCTENES
Paul R. Stapp, Bartlesville, Okla., assignor to Phillips
Petroleum Company, a corporation of Delaware
No Drawing. Filed Aug. 8, 1966, Ser. No. 570,691
2 Claims. (Cl. 260—648)

ABSTRACT OF THE DISCLOSURE

Novel adducts of $\Delta^2$-bicyclo[3,3,0]-octenes and hexahalogenated cyclopentadiene have been prepared. Said adducts are useful as flame retardants for thermoplastic materials such as polyolefins and at least one of which is an insecticide.

---

This application relates to adducts of bicyclo-3,3,0-octenes.

In my copending application Ser. No. 370,100, filed May 25, 1964, now Patent No. 3,363,016, there is disclosed and claimed a process for the isomerization of cyclooctadiene compounds to $\Delta^2$-bicyclo-3,3,0-octene compounds.

I have now discovered that new and useful adducts of said $\Delta^2$-bycyclo-3,3,0-octenes can be formed by reacting same with a hexahalogenated cyclopentadiene. Thus, broadly speaking, the present invention resides in said adducts as new compounds and methods of preparing said new adducts.

An object of this invention is to provide a process for preparing adducts of $\Delta^2$-bicyclo-3,3,0-octenes. Another object of this invention is to provide novel compounds which are adducts of $\Delta^2$-bicyclo-3,3,0-octenes. Another object of the invention is to provide adducts of $\Delta^2$-bicyclo-3,3,0-octenes, at least one of which is useful as an insecticide as shown in Examples III and IV hereinafter. Other aspects, objects, and advantages of the invention will be apparent to those skilled in the art in view of this disclosure.

Thus, according to the invention, there are provided, as new compounds, the 4,7-methanocyclopent[a]indene compounds characterized by the structural formula

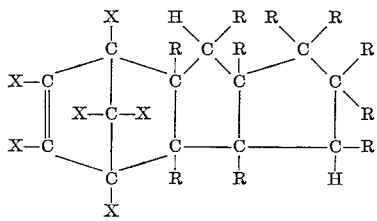

wherein each X is a halogen atom selected from the group consisting of chlorine, bromine, iodine, and fluorine, each R is selected from the group consisting of a hydrogen atom, and alkyl, aryl, aralkyl, alkaryl, and cycloalkyl radicals containing from 1 to 8 carbon atoms, and at least seven of said R substituents are hydrogen.

Further according to the invention, there is provided a method for preparing said indene compounds described in the preceding paragraph, which process comprises reacting a $\Delta^2$-bicyclo-3,3,0-octene with a hexahalogenated cyclopentadiene.

Examples of $\Delta^2$-bicyclo-3,3,0-octene compounds which can be used as one reactant in the formation of the adducts of this invention include those represented by the structural formula

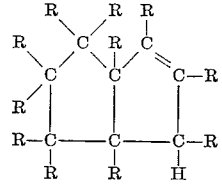

wherein each R is selected from the group consisting of a hydrogen atom, and alkyl, aryl, aralkyl, alkaryl, and cycloalkyl radicals containing from 1 to 8 carbon atoms, inclusive, and at least 7 of said R substituents are hydrogen.

The above-described $\Delta^2$-bicyclo-3,3,0-octene compounds are preferably formed by the isomerization of cyclooctadienes. The preferred bicyclooctenes are those which are obtained by the isomerization of cyclooctadienes which are dimers of butadiene, isoprene, and piperylene. Some examples of said bicyclooctenes of the above general formula which can be used as one of the reactants in the process of this invention include, among others, the following:

1,8-dimethyl-$\Delta^2$-bicyclo-3,3,0-octene
4,7-dimethyl-$\Delta^2$-bicyclo-3,3,0-octene
1,5-dimethyl-$\Delta^2$-bicyclo-3,3,0-octene
4,6-dimethyl-$\Delta^2$-bicyclo-3,3,0-octene
6,7-dimethyl-$\Delta^2$-bicyclo-3,3,0-octene
5,6-dimethyl-$\Delta^2$-bicyclo-3,3,0-octene
4-phenyl-$\Delta^2$-bicyclo-3,3,0-octene
6-phenyl-$\Delta^2$-bicyclo-3,3,0-octene
4-n-butyl-$\Delta^2$-bicyclo-3,3,0-octene
6-tert-hexyl-$\Delta^2$-bicyclo-3,3,0-octene
7-n-octyl-$\Delta^2$-bicyclo-3,3,0-octene
4-cyclohexyl-$\Delta^2$-bicyclo-3,3,0-octene
4-cyclooctyl-$\Delta^2$-bicyclo-3,3,0-octene
4-(2-phenylethyl)-$\Delta^2$-bicyclo-3,3,0-octene
4-(4-ethylphenyl)-$\Delta^2$-bicyclo-3,3,0-octene and the like.

Hexahalogenated cyclopentadienes which can be used as the other reactant in the formation of the adducts of this invention include compounds wherein all the halogen atoms are the same, e.g., hexachlorocyclopentadiene and hexabromocyclopentadiene, and also compounds containing a mixture of halogens, e.g., tetrachlorodibromocyclopentadiene, bromopentachlorocyclopentadiene, etc. It is also within the scope of the invention to use hexahalogenated cyclopentadienes wherein some of the halogen atoms are iodine and/or fluorine. These compounds can all be prepared by methods known to the art. The hexachloro and hexabromo compounds are presently preferred because of ease of preparation and availability. Hexachlorocyclopentadiene is the presently most preferred.

In one presently preferred method for forming the adducts of this invention, a $\Delta^2$-bicyclo-3,3,0-octene compound is mixed with hexahalogenated cyclopentadiene compound in a reaction vessel at an octene to cyclopentadiene mol ratio within the range of from 0.5:1 to 1.5:1, preferably 1:1 to 1.2:1. The resulting mixture is heated to a temperature within the range of from about 100 to about 200, preferably about 125 to about 175° C. The reaction time will usually be within the range of from 0.05 to 72, preferably 0.1 to 48, hours. Pressure is not critical. The reaction can be carried out at superatmospheric or subatmospheric pressures. Preferably, the reaction is carried out under liquid phase conditions; but vapor phase conditions are within the scope of the invention. Preferably, the reaction is carried out in the absence of a solvent. However, it is within the scope of the invention to carry out the reaction in the presence of a solvent. Any suitable solvent which is chemically inert with the reactants under the reaction conditions involved can be employed in the practice of the invention.

After the reactants have been reacted, the resulting adduct can be recovered from the reaction mixture by any suitable method. For example, one suitable method comprises pouring the reaction mixture into an excess of a solvent such as methanol, ethanol, ethyl ether, or the like. If desired or necessary, the thus diluted mixture can be decolorized by subjecting the solution to a decolorizing treatment by the addition thereto of a suitable decolorizing agent such as activated charcoal. Said decolorizing treatment can be carried out by contacting the solution with charcoal in any suitable manner and then filtering same. After decolorization, the solvent is removed by any suitable manner such as evaporation and the reaction product recovered using such conventional methods as distillation, fractional crystallization, and the like.

The following examples will serve to further illustrate the invention.

EXAMPLE I

A sample of cis,cis-1,3-cyclooctadiene was isomerized to cis-$\Delta^2$-bicyclo-3,3,0-octene in accordance with the method of said copending application Ser. No. 370,100, in the following manner. To a 1-liter stirred autoclave there was charged 15.6 grams of potassium, 21.6 grams of anisole, and 265 grams of cis-cis-1,3-cyclooctadiene. The autoclave was flushed with nitrogen, sealed, and heated at 200° C. for 18 hours. After cooling, the catalyst was destroyed with methanol, the mixture was treated with water, the layers were separated, and the aqueous layer was extracted with pentane. The combined organic layers were then washed with water and dried over magnesium sulfate. The pentane was evaporated off, and the residue was distilled, yielding 171 grams of material boiling at 122–134° C. and 45 grams of higher boiling residue. Vapor phase chromatographic analysis of the distillate showed that it contained 95 percent (162 grams) of bicyclic compounds and 5 percent (9 grams) of unchanged 1,3-cyclooctadiene. The bicyclic compounds contained 98 percent of cis-$\Delta^2$-bicyclo-3,3,0-octene as identified below, and approximately 2 percent of cis-bicyclo[3,3,0]octane. This represents a 96.6 percent conversion of 1,3-cyclooctadiene and a 63 percent ultimate yield of $\Delta^2$-bicyclic-3,3,0-octene.

Fractional distillation of said distillate yielded a pure compound having a boiling point of 132–133° C. and a refractive index $n_D^{20}$ of 1.4750. This compares with the properties for cis-$\Delta^2$-bicyclo-3,3,0-octene given in Bull. Soc. Chim. France, 473 (1960), boiling point 131–132° C. and $n_D^{20}$ of 1.4760.

EXAMPLE II

A run was carried out in which an adduct was formed in accordance with the invention by the reaction of hexachlorocyclopentadiene and a sample of said pure cis-$\Delta^2$-bicyclo-3,3,0-octene from Example I. In this run a mixture of 16.2 grams (0.17 mol) of cis-$\Delta^2$-bicyclo-3,3,0-octene and 31.0 grams (0.113 mol) of hexachlorocyclopentadiene was heated to 140–150° C. under nitrogen for 24 hours. After cooling to approximately room temperature, the resulting reaction mixture was poured into 200 ml. of absolute ethanol. The resulting solution was heated to boiling, filtered, and then decolorized by stirring with a small amount of activated charcoal (Norit A) and filtering again. The filtrate was then concentrated to about 60 ml. by evaporation at atmospheric pressure after which the solution was further evaporated on a rotary evaporator under vacuum. The resulting viscous oil was then distilled under reduced pressure to yield 28.8 grams of bright yellow oil boiling in the range of 136–139° C. at 0.3 mm. mercury absolute pressure. The refractive index of this material was $n_D^{20}$ 1.5745. An elemental analysis of this material gave the following results:

*Elemental analysis.*—Calculated for $C_{13}H_{12}Cl_6$: C, 40.98%; H, 3.17%; Cl, 55.84%. Found: C, 41.7%; H, 3.3%; Cl. 53.2%. The adduct formed in the above run thus was 1,2,3,3a,4,7,7a,8,8a-decahydro-4,5,6,7,9,9-hexachloro-4,7-methanocyclopent[a]indene which can be represented by the following structural formula.

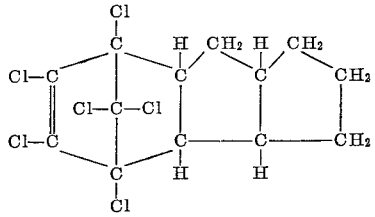

EXAMPLE III

The compound of Example II was tested as an insecticide for Mexican bean beetles. An aqueous test formulation consisting essentially of water, 1000 parts by weight of said compound of Example II per million parts by weight of formulation, 4 weight percent acetone, and 0.01 weight percent Triton X–155 (a surfactant), was prepared for use in these tests. The test procedure used is as follows.

Fourth instar larvae of the Mexican bean beetle (*E. varivestis*) less than one-day-old within the instar are used as the test species. Paired fully expanded primary leaves excised from tender green bean plants are dipped in the test formulation and agitated until they are thoroughly wetted. The chemical deposited on the leaves is then dried and the paired leaves separated. The drying is accomplished by first placing the excised stem in water to prevent wilting and then holding the leaves in a hood with the fan operating. One leaf is placed into each of two Dixie cups (5 oz.) and five randomly selected larvae are counted into each Dixie cup which is then covered with a 9 cm. Petri dish cover. The cups are held at 70° F. for three days after which mortality is determined.

Two test runs were carried out. In one run the leaves were dipped in a test formulation as described above containing 1000 p.p.m. of the said compound. The mortality of the beetles in this run was 100 percent. In another run the leaves were dipped in a test formulation as described above which contained 500 p.p.m. of the test chemical. The mortality rate in this run was 70 percent. In a control run carried out using a formulation like said test run formulation except that it contained none of the test chemical, the mortality rate was zero percent.

EXAMPLE IV

The compound of Example II was also tested as an insecticide for houseflies. The test chemical formulations had the same composition as described above in Example III. The test procedure is as follows.

The test apparatus comprises 125 ml. Erlenmeyer flasks stoppered with two-hole rubber stoppers fitted with two pieces of glass tubing; one being long, curved, and of 9 mm. outer diameter, while the other is smaller in diameter, short, and has a 90° bend. Adult houseflies (male and female) are anesthetized with carbon dioxide and transferred to a Buchner funnel, the stem of which is connected to a source of slowly flowing carbon dioxide. Under these conditions, the houseflies can be maintained immobile for at least 45 minutes with no ill effects. A test is accomplished by connecting the smaller glass tubing to a vacuum line; inserting the rubber stopper into a flask containing the test chemical formulation; and then, with the aid of the vacuum, drawing 10 flies into the flask where the drop onto the surface of the test chemical formulation. The rubber stopper is removed from the flask, and the flask is swirled, wetting the flies with the formulation. The contents of the flask are then quickly poured onto a copper wire screen which retains the flies, but permits the formulation to pass through to a beaker where it is available for further testing. The flies are drained a few seconds and then transferred to a 5-oz. Dixie cup containing a disc of 7 cm. Whatman No. 1 filter paper, the cup is immediately covered with a Petri dish lid. The filter paper used is pretreated by soaking it in a 10 percent sucrose solution and drying it, and it thereby serves two purposes in the Dixie cup: it is a source of needed nutrition, and it absorbs excess formulation from the bodies of the flies. Mortality is determined one day after treatment.

Two test runs were carried out. In one run the houseflies were immersed as described above in a test formulation containing 1000 p.p.m. of the test chemical (the compound of Example II). The mortality rate in this run was 100 percent. In a second test run carried out in the same manner except that the test formulation contained only 500 p.p.m. of said test chemical, the mortality rate was also 100 percent. In a control run carried out in the same manner except that the test formulation did not contain any of said test chemical, the mortality rate was zero percent.

The new insecticidal compounds of the invention may be utilized in the form of oil sprays, dust, aqueous emulsions, aerosols, etc., either alone or in association with any other desired toxicants in preparations and by methods of application known to the art. The adducts of the invention are also useful as flame retardants for thermoplastic materials such as polyolefins.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:
1. The 4,7 - methanocyclopent[a]indene compounds characterized by the structural formula

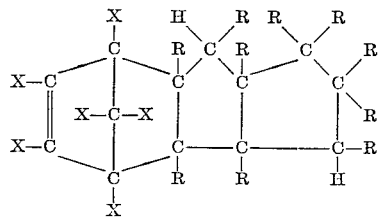

wherein each X is a halogen atom selected from the group consisting of chlorine bromine, iodine, and fluorine, each R is selected from the group consisting of a hydrogen atom, and alkyl, aryl, aralkyl, alkaryl, and cycloalkyl radicals containing from 1 to 8 carbon atoms, and at least seven of said R substituents are hydrogen.

2. A compound in accordance with claim 1, and identified as 1,2,3,3a,3b,4,7,7a,8,8a-decahydro-4,5,6,7,9,9-hexachloro-4,7-methanocyclopent[a]indene.

References Cited

UNITED STATES PATENTS 2,606,910   8/1952   Herzfeld _____ 260—649

LEON ZITVER, *Primary Examiner.*

M. JACOB, *Assistant Examiner.*

U.S. Cl. X.R.

167—30; 260—45.7, 649